United States Patent
Bhaskaran et al.

(10) Patent No.: US 10,594,884 B2
(45) Date of Patent: Mar. 17, 2020

(54) DEVICE REGIONALIZATION BASED ON GEOGRAPHIC LOCATION

(71) Applicant: Hewlett-Packard Development Company, L.P., Houston, TX (US)

(72) Inventors: Shinoj Bhaskaran, Bangalore (IN); Godwin Joseph, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/085,941

(22) PCT Filed: Dec. 2, 2016

(86) PCT No.: PCT/US2016/064678
§ 371 (c)(1),
(2) Date: Sep. 17, 2018

(87) PCT Pub. No.: WO2017/222587
PCT Pub. Date: Dec. 28, 2017

(65) Prior Publication Data
US 2019/0098158 A1    Mar. 28, 2019

(30) Foreign Application Priority Data
Jun. 25, 2016   (IN) .............................. 201641021861

(51) Int. Cl.
*H04N 1/00* (2006.01)
*G01S 19/13* (2010.01)
*G01S 19/14* (2010.01)
*H04W 4/021* (2018.01)
*G06K 15/02* (2006.01)

(52) U.S. Cl.
CPC ......... *H04N 1/00854* (2013.01); *G01S 19/13* (2013.01); *G01S 19/14* (2013.01); *H04W 4/021* (2013.01); *G06K 15/02* (2013.01)

(58) Field of Classification Search
CPC .................................................. H04N 1/00854
USPC ......................................................... 358/1.14
See application file for complete search history.

(56) References Cited

U.S. PATENT DOCUMENTS

| | | |
|---|---|---|
| 7,356,279 B2 | 4/2008 | Miller |
| 7,551,859 B2 | 6/2009 | Miller et al. |
| 8,599,424 B2 | 12/2013 | Vinocur et al. |
| 9,160,640 B1 | 10/2015 | Carlson et al. |

(Continued)

OTHER PUBLICATIONS

Ppntillo—"How to Change the Regin Code of HP Printer?"—Feb. 11, 2013—< http://starrguide.com/change-or-reset-hp-printer-region-code/ > 4 Pages.

*Primary Examiner* — Jacky X Zheng
(74) *Attorney, Agent, or Firm* — HP Inc. Patent Department

(57) ABSTRACT

In one example, a method is described, in which a geographic location of an electronic device may be determined. Further, a region code may be read from a device component installed in the electronic device. Furthermore, the geographic location of the electronic device may be compared with the region code of the device component. The electronic device may be enabled to function with the device component when the geographic location of the electronic device falls under a region defined by the region code.

15 Claims, 4 Drawing Sheets

(56) References Cited

U.S. PATENT DOCUMENTS

2005/0108445 A1* 5/2005 Lassner ............... G06F 9/454
710/16
2016/0219159 A1* 7/2016 Iezaki ............... G06F 3/1423
2017/0286036 A1* 10/2017 Wong ............... G06F 3/1292

* cited by examiner

DEVICE REGIONALIZATION BASED ON GEOGRAPHIC LOCATION

BACKGROUND

Manufacturers may geographically regionalize printing devices, such as printers, copiers, facsimile machines, multi-function peripheral (MFP) devices. This may enable the manufacturers to maintain control over the prices of device components (e.g., cartridges) that are available for use with the printing devices in relation to the location in which the devices are sold and used. For instance, the manufacturers may lower the cost of the device components in some regions to ensure that customers in those regions can afford such components, and to maintain a higher price for the device components in regions in which the market price for such components is higher.

BRIEF DESCRIPTION OF THE DRAWINGS

Examples are described in the following detailed description and in reference to the drawings, in which.

DETAILED DESCRIPTION

The consumer supplies, such as cartridges, may be regionalized so that manufacturers may not lose revenue by import of such supplies from other regions that might be cheaper. In some existing methods, once a cartridge is placed for a first time in a printing device, the printing device may lock to a region indicated in the cartridge, for example, upon a number of pages that have been printed by the printing device reaches a predetermined threshold. When a user relocates the printing device to a different region (e.g., due to business reasons), the user may be forced to purchase the supplies from the old region as the printing device may be locked to the old region indicated in the cartridge. This may cause an inconvenience to the user as the user may have to ship the cartridges from the old region which may involve additional cost (e.g., shipping charges), thereby making the printing device not usable when the user shifts from one region to another region.

Examples described herein describes about a printing device having a location determining unit (e.g., global positioning system (GPS)-based service) to determine a geographic location of the printing device. For example, the printing device may know the region in which the printing device is physically located at any given point in time using the GPS-based service. The printing device may further include a code retrieving unit to read a region code embedded within a device component when the device component is installed in the printing device. Also, the printing device may include an authentication unit to compare the region code of the device component with the geographic location of the printing device, and enable the printing device to function with the device component when the region code of the device component matches with the geographic location of the printing device.

As described below, examples described herein may enable seamless use of the printing device when the printing device is relocated to a different geographic region. Further, examples described herein may allow a user to purchase and use the supplies (e.g., cartridges) from the new region when the customer relocates to the new region without contacting customer support, for instance, to unlock the printing device in the new region. Examples described herein may save cost to ship the supplies (e.g., cartridges) from the old region to the new region as the supplies from the new region can be purchased and used.

Figure 1:
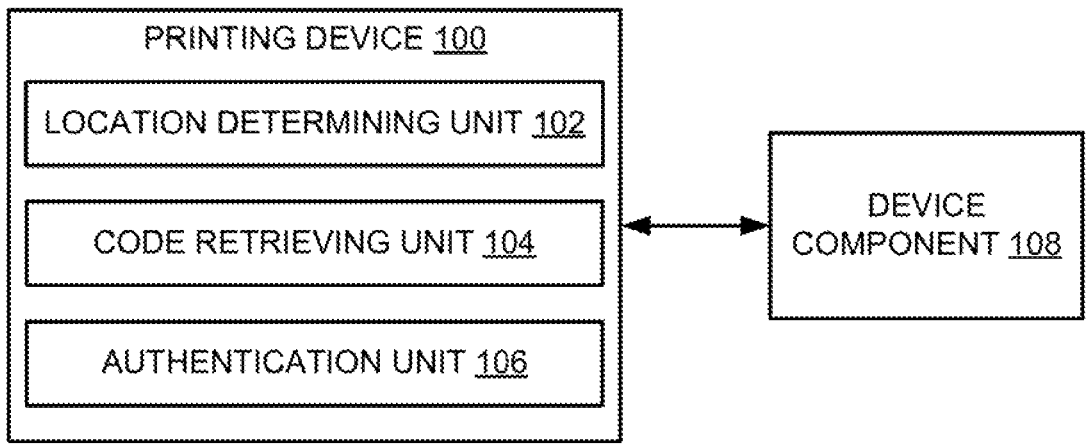
FIG. 1 is a block diagram of an example printing device including components to regionalize the printing device based on geographic location.

Turning now to the figures, FIG. 1 is a block diagram of an example printing device 100 including components to regionalize printing device 100 based on geographic location. The term "printing device" may refer to any image forming apparatus that accepts the use of a cartridge. Example printing device 100 may include a printer, a copier, a facsimile (fax) device, and a multi-function device (MFD). Printing device 100 may include a location determining unit 102, a code retrieving unit 104 and an authentication unit 106. Location determining unit 102, code retrieving unit 104 and authentication unit 106 may be communicatively coupled/interactive with each other to perform the functionalities described herein.

During operation, location determining unit 102 may determine a geographic location of printing device 100. For example, location determining unit 102 may be a GPS-based device to determine the geographic location of printing device 100. In another example, location determining unit 102 may determine the geographic location of printing device 100 (i.e., a region where printing device 100 is located) using the GPS-based service installed in printing device 100. Location determining unit 102 may provide the geographical location of printing device 100 as a set of co-ordinates, i.e., GPS coordinate data specifying latitude, longitude and elevation. Example determination of the geographic location of printing device 100 using the GPS-based service is explained in FIG. 2, which depicts additional components.

Figure 2:
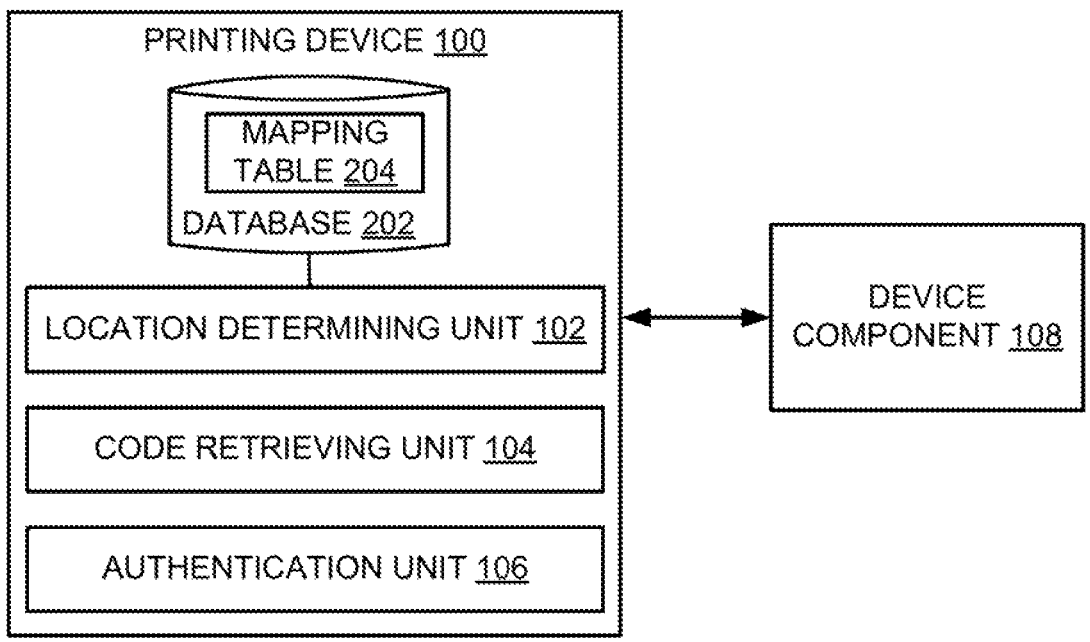
FIG. 2 is a block diagram of the example printing device illustrating additional components.

As shown in FIG. 2, printing device 100 may include a database 202 including a mapping table 204. Database 202 may include a storage unit to store mapping table 204. Mapping table 204 may include a plurality of geographic regions and corresponding coordinate data. Example geographic region may include a country (e.g., India) or a group of countries (e.g., Asia-Pacific countries). In one example, location determining unit 102 may identify coordinate-based location information for printing device 100 (e.g., GPS coordinate data) using the GPS-based service and map the coordinate-based location information to predefined geographic regions within mapping table 204 to determine the geographic location of printing device 100. In the example of FIG. 2, database 202 is shown as being residing in printing device 100, however, database 202 can also be implemented as a part of location determining unit 102.

Further, code retrieving unit 104 may read a region code embedded within a device component 108 when device component 108 is installed in printing device 100. Example device component 108 may include a cartridge and an accessory tray for printing device 100. The cartridge may include various elements that supply a printing medium (e.g., dry toner or ink) to printing device 100. Device component 108 can be installed into printing device 100, for instance, by the end user, prior to printing device operation. Device component 108 may be a removable (e.g., disposable) component that, for instance, is replaced once the component's usable life has expired.

In one example, device component 108 may include encoded information about a given region to which device component 108 pertains. Accordingly, device component 108 may include a region code that can be provided to printing device 100 once device component 108 is installed. For example, device component 108 may have a microcontroller to store the region code.

For example, during the printing device assembly process, user may install device component 108 in printing device 100 and may then activate printing device 100. When device component 108 is a print cartridge, the user can insert the cartridge in the appropriate location within printing device 100. Once printing device 100 is powered on/activated, printing device 100 may obtain the region code from device component 108. For example, the process of obtaining the region code from device component 108 may occur each time when printing device 100 is turned on and/or when the cartridge is installed in printing device 100.

Furthermore, authentication unit 106 may compare the region code of device component 108 with the geographic location of printing device 100. In one example, authentication unit 106 may verify whether the geographic location of printing device 100 falls under a region defined by the region code. In one example, device component 108 may include a plurality of region codes defining a plurality of regions. In such case, authentication unit 106 may verify whether the geographic location of printing device 100 matches with one of the regions defined in device component 108.

In one example, authentication unit 106 may enable printing device 100 to function with device component 108 when the region code of device component 108 matches with the geographic location of printing device 100. In another example, authentication unit 106 may disable printing device 100 to function with device component 108 and generate an error message on printing device 100 when the region code of device component 108 does not match with the geographic location of printing device 100.

In one example, authentication unit 106 may remember the old geographic location (e.g., first geographic location) of printing device 100 for a predefined period when printing device 100 is relocated to another geographic location (e.g., second geographic location). Authentication unit 106 may enable printing device 100 to function with device component 108 associated with the first geographic location for the predefined period. This is explained in FIG. 3.

Figure 3:
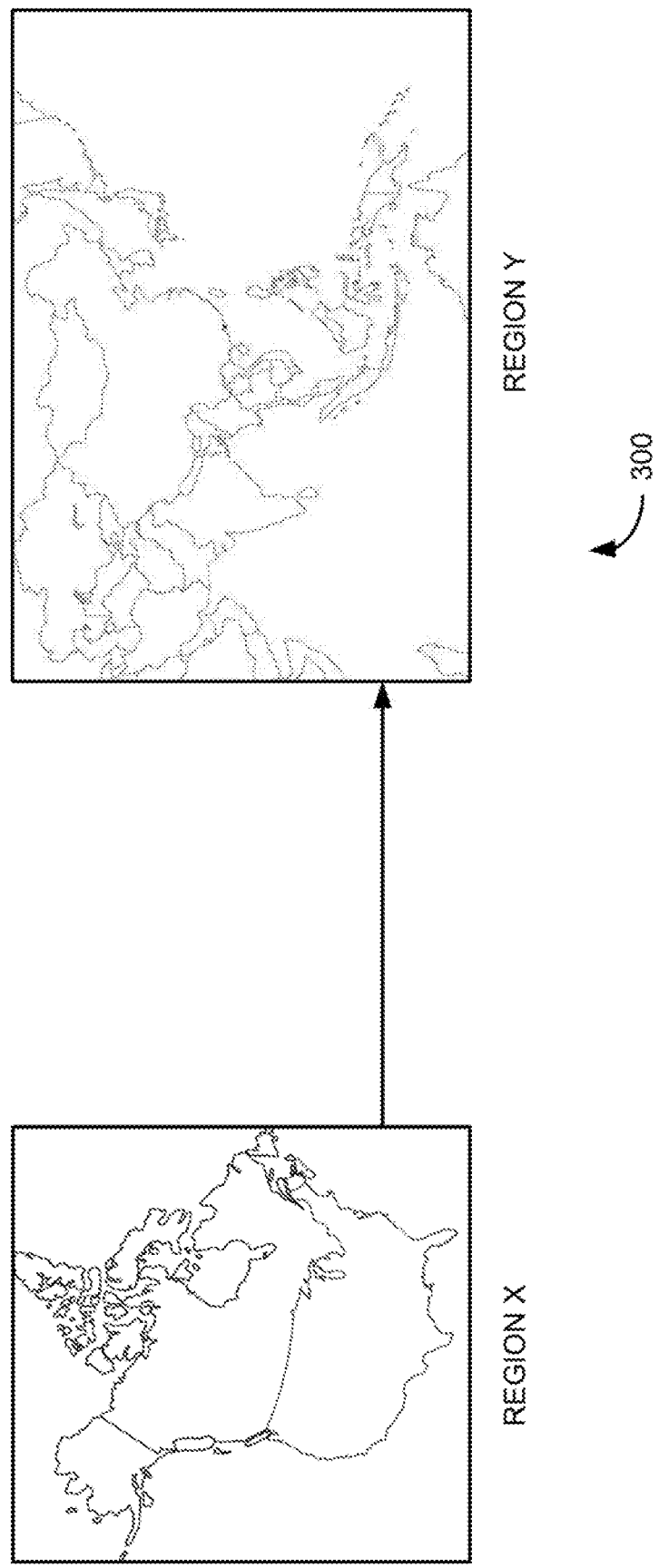
FIG. 3 is an example scenario illustrating regionalization of a printing device when the printing device is relocated from one region to another region.

FIG. 3 is an example scenario 300 illustrating regionalization of printing device 100 when printing device 100 is relocated from one region (e.g., region X) to another region (e.g., region Y). For example, when the user purchased a printer and few additional sets of cartridges from region X and then relocates to region Y, authentication unit 106/machine-readable instructions in printing device 100 may remember old region X for a specified duration of time and allow the cartridges from region X during this time period. In such cases, the printer may allow usage of cartridges from both regions X and Y during the specified duration of time.

In one example, the components of printing device 100 may be implemented in hardware, machine-readable instructions or a combination thereof. In one example, each of location determining unit 102, code retrieving unit 104, and authentication unit 106 may be implemented as engines or modules comprising any combination of hardware and programming to implement the functionalities described herein. Even though FIG. 1 describes about printing device 100, the functionality of the components of printing device 100 may be implemented in other electronic devices such as personal computers (PCs), server computers, tablet computers, mobile devices and the like.

Printing device 100 may include computer-readable storage medium comprising (e.g., encoded with) instructions executable by a processor to implement functionalities described herein in relation to FIGS. 1-2. In some examples, the functionalities described herein, in relation to instructions to implement functions of location determining unit 102, code retrieving unit 104, and authentication unit 106 and any additional instructions described herein in relation to the storage medium, may be implemented as engines or modules comprising any combination of hardware and programming to implement the functionalities of the modules or engines described herein. The functions of location determining unit 102, code retrieving unit 104, and authentication unit 106 may also be implemented by the processor. In examples described herein, the processor may include, for example, one processor or multiple processors included in a single device or distributed across multiple devices.

Figure 4:
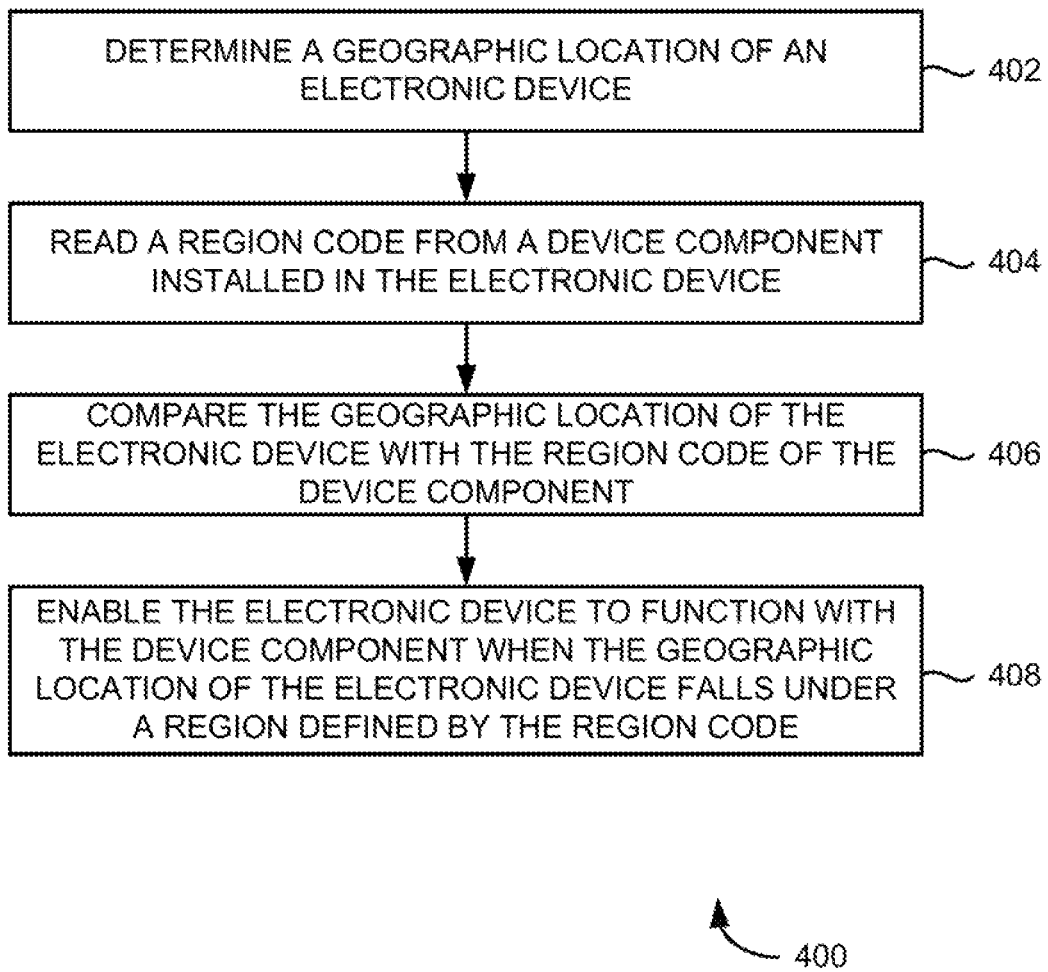
FIG. 4 is an example flow chart of a method for device regionalization based on geographic location.

FIG. 4 is an example flow chart 400 of a method for device regionalization based on geographic location. The device regionalization can be a country-based (e.g. India), group-based (e.g., Asia-Pacific countries) and the like. It should be understood that the process depicted in FIG. 4 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, a geographic location of an electronic device may be determined, for instance, using a GPS-based service. Example electronic device may include a printer, a copier, a facsimile (fax) device, a MFD, and other computing devices. In one example, coordinate-based location information may be identified for the electronic device. Example coordinate-based location information may include GPS coordinate data. Further, the geographic location of the electronic device may be determined by mapping the coordinate-based location information to geographic regions defined in a mapping table stored in the electronic device. In another example, the geographic location of the printing device may also be determined using internet protocol (IP) address-based service in case of an internet printer protocol (IPP)-enabled printer, wireless data and cellular tower-based location techniques or a hybrid approach that uses any combination thereof including the GPS-based service.

At 404, a region code may be read/retrieved from a device component installed in the electronic device. In one example, the region code may include encoded information about a given region to which the device component pertains. Further, the electronic device may include programming to read the region code from the device component. Example device component may include a cartridge or an accessory tray. In one example, when the electronic device is a printing device, then the device component may include a cartridge. In another example, when the electronic device is a mobile device, then the device component may include a head phone/ear phone.

At 406, the geographic location of the electronic device is compared with the region code of the device component. At 408, the electronic device is enabled to function (e.g., to be used) with the device component when the geographic location of the electronic device falls under a region defined by the region code. In another example, an error message for the electronic device is generated when the geographic location of the electronic device does not fall under the region defined by the region code.

The process 400 of FIG. 4 may show example process and it should be understood that other configurations can be employed to practice the techniques of the present application. For example, process 400 may communicate with a plurality of computing devices and the like.

Figure 5:
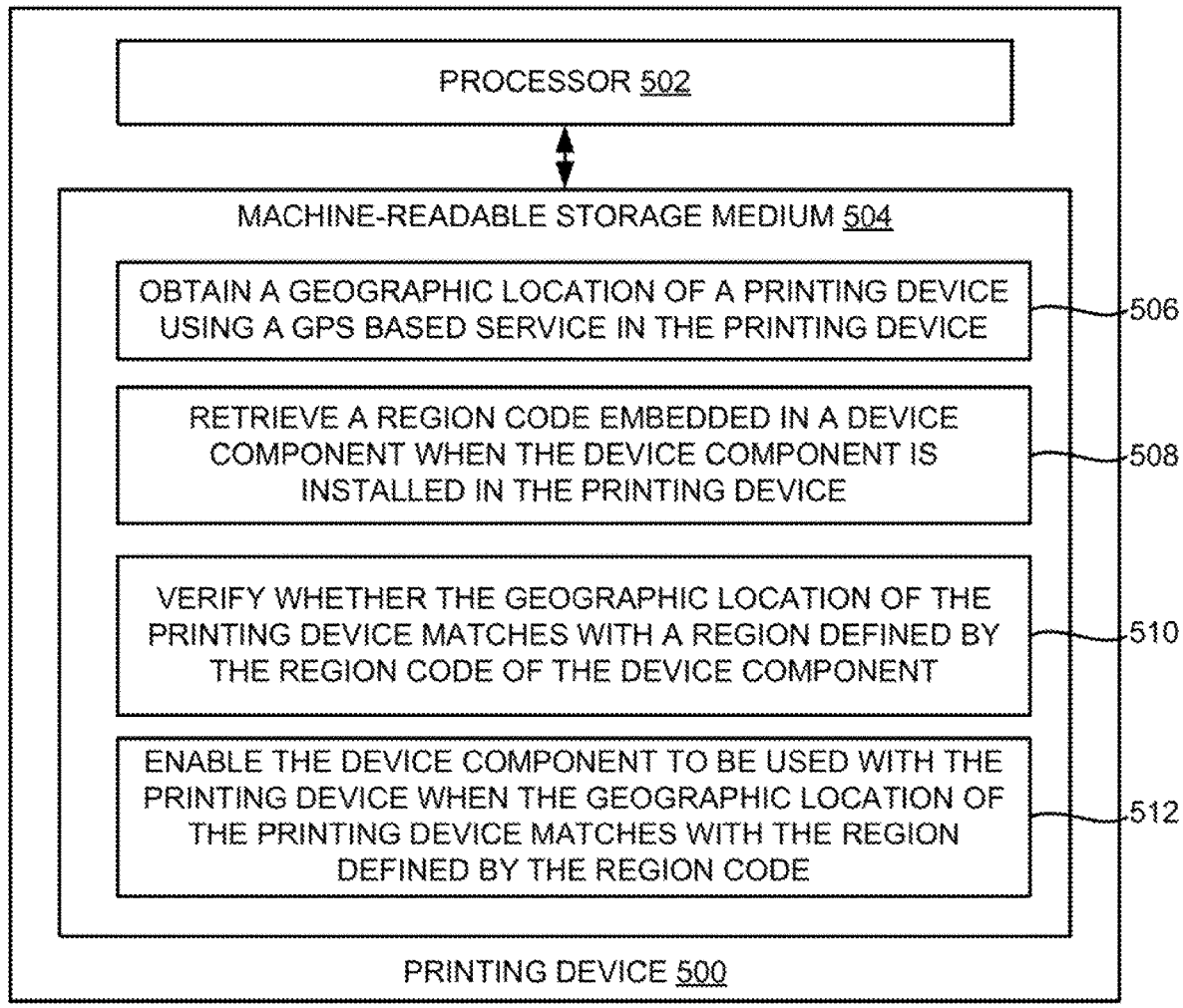
FIG. 5 illustrates a block diagram of an example printing device with device regionalization functionality based on geographic location.

FIG. 5 illustrates a block diagram of an example printing device 500 having regionalization functionality based on geographic location. Printing device 500 may include processor 502 and a machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to printing device 500.

Machine-readable storage medium 504 may store instructions 506-512. In an example, instructions 506-512 may be executed by processor 502 to provide a mechanism for device regionalization based on geographic location. Instructions 506 may be executed by processor 502 to obtain a geographic location of printing device 500 using a GPS-based service in printing device 500. Instructions 508 may be executed by processor 502 to retrieve a region code embedded in a device component when the device component is installed in printing device 500. Instructions 510 may be executed by processor 502 to verify whether the geographic location of printing device 500 matches with a region defined by the region code of the device component.

Instructions 512 may be executed by processor 502 to enable the device component to be used with printing device 500 when the geographic location of printing device 500 matches with the region defined by the region code. Further, machine-readable storage medium 504 may store instructions to disable the device component to be used with printing device 500 and generate an error message when the geographic location of printing device 500 does not match with the region defined by the region code.

It may be noted that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A printing device, comprising:
a location determining unit implemented by a processor to determine a geographic location of the printing device, comprising identifying coordinate-based location information for the printing device and mapping the coordinate-based location information to predefined geographic regions in a database;
a code retrieving unit implemented by the processor to read a region code embedded within a device component when the device component is installed in the printing device; and
an authentication unit implemented by the processor to:
compare the region code of the device component with the geographic location of the printing device; and
disable the printing device to function with the device component when the region code of the device component does not match with the geographic location of the printing device.

2. The printing device of claim 1, wherein the location determining unit is to determine the geographic location of the printing device using a global positioning system (GPS)-based service.

3. The printing device of claim 1, wherein the location determining unit provides the geographical location of the printing device as a set of co-ordinates.

4. The printing device of claim 1, wherein the authentication unit is to generate an error message on the printing device when the region code of the device component does not match with the geographic location of the printing device.

5. The printing device of claim 1, wherein the printing device comprises one of a printer, a copier, a facsimile (fax) device, and a multi-function device (MFD).

6. The printing device of claim 1, wherein the device component comprises one of a cartridge and an accessory tray.

7. The printing device of claim 1, wherein the authentication unit is to:
remember a first geographic location of the printing device for a predefined period when the printing device is relocated from the first geographic location to a second geographic location; and enable the printing device to function with the device component associated with the first geographic location for the predefined period.

8. A method comprising:

determining a geographic location of an electronic device, comprising identifying coordinate-based location information for the electronic device and mapping the coordinate-based location information to predefined geographic regions in a database;

reading a region code from a device component installed in the electronic device;

comparing the geographic location of the electronic device with the region code of the device component; and disabling the electronic device to function with the device component when the geographic location of the electronic device does not fall under a region defined by the region code.

9. The method of claim 8, wherein the coordinate-based location information comprises global positioning system (GPS) coordinate data; and wherein the predefined geographic regions are defined in a mapping table in the database stored in the electronic device.

10. The method of claim 8, wherein the geographic location of the electronic device is determined using a GPS-based service.

11. The method of claim 8, further comprising:

generating an error message for the electronic device when the geographic location of the electronic device does not fall under the region defined by the region code.

12. The method of claim 8, wherein the electronic device comprises one of a printer, a copier, a facsimile (fax) device, and a multi-function device (MFD), and wherein the device component comprises one of a cartridge and an accessory tray.

13. A non-transitory machine-readable storage medium comprising instructions executable by a processor to:

obtain a geographic location of a printing device using a global positioning system (GPS)-based service in the printing device, comprising identifying coordinate-based location information for the printing device and mapping the coordinate-based location information to predefined geographic regions in a database;

retrieve a region code embedded in a device component when the device component is installed in the printing device;

verify whether the geographic location of the printing device matches with a region defined by the region code of the device component; and disable the device component to be used with the printing device when the geographic location of the printing device does not match with the region defined by the region code.

14. The non-transitory machine-readable storage medium of claim 13, further comprising instructions to:

generate an error message when the geographic location of the printing device does not match with the region defined by the region code.

15. The non-transitory machine-readable storage medium of claim 13, further comprising instructions to:

remember a first geographic location of the printing device for a predefined period when the printing device is relocated from the first geographic location to a second geographic location; and enable the printing device to function with the device component associated with the first geographic location for the predefined period.

* * * * *